Feb. 23, 1937.　　　A. J. BAZELEY　　　2,071,491
CENTRALIZING AND CONTROLLING MECHANISM FOR CAR COUPLERS
Filed June 27, 1934　　　9 Sheets-Sheet 1

INVENTOR:
Arthur J. Bazeley
BY Clarence D. Kerr
his ATTORNEY

Feb. 23, 1937.  A. J. BAZELEY  2,071,491
CENTRALIZING AND CONTROLLING MECHANISM FOR CAR COUPLERS
Filed June 27, 1934   9 Sheets-Sheet 2

INVENTOR:
Arthur J. Bazeley
BY Clarence D. Kerr
his ATTORNEY

Feb. 23, 1937.  A. J. BAZELEY  2,071,491
CENTRALIZING AND CONTROLLING MECHANISM FOR CAR COUPLERS
Filed June 27, 1934   9 Sheets-Sheet 4

INVENTOR:
Arthur J. Bazeley
BY Clarence D. Kerr
his ATTORNEY

Feb. 23, 1937.  A. J. BAZELEY  2,071,491
CENTRALIZING AND CONTROLLING MECHANISM FOR CAR COUPLERS
Filed June 27, 1934    9 Sheets-Sheet 8

Fig. 21.

INVENTOR:
Arthur J. Bazeley
BY Clarence Kerr
his ATTORNEY

Patented Feb. 23, 1937

2,071,491

UNITED STATES PATENT OFFICE 2,071,491

CENTRALIZING AND CONTROLLING MECHANISM FOR CAR COUPLERS

Arthur J. Bazeley, Shaker Heights, Ohio, assignor to National Malleable and Steel Castings Company, Cleveland, Ohio, a corporation of Ohio Application June 27, 1934, Serial No. 732,617

44 Claims. (Cl. 213—17)

This invention relates to mechanism for centering railway car couplers and controlling the lateral displacements thereof. A prime object of the invention resides in the provision of a new and improved mechanism comprising centering means whereby the coupler may be normally urged toward central position upon lateral displacement therefrom in either of opposite directions and further comprising provisions whereby the centering mechanism may be expeditiously neutralized and the coupler readily shifted manually in either direction, when desired, to enable coupling to be accomplished on curves. In this connection, the provision of novel and effective means for throwing the centering means out of action and enabling the coupler to be drawn manually to either side of its central position constitutes an outstanding feature of the invention. The foregoing ends are, furthermore, attained by elements combined and interrelated in a novel and highly efficient manner, and correlated in a construction of sturdy character which, moreover, is capable of facile assembly and disassembly. The invention further comprises various novel combinations and features which will be more particularly pointed out in the ensuing description and defined in the appended claims.

Figure 1:
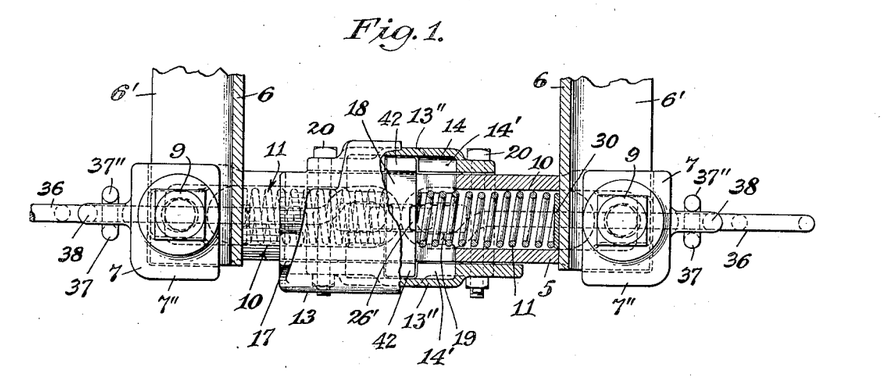
Fig. 1 is a plan view, partly in section, showing an embodiment of my invention, intended especially for freight cars, the parts being shown in central or normal position.
Figures 2, 23:
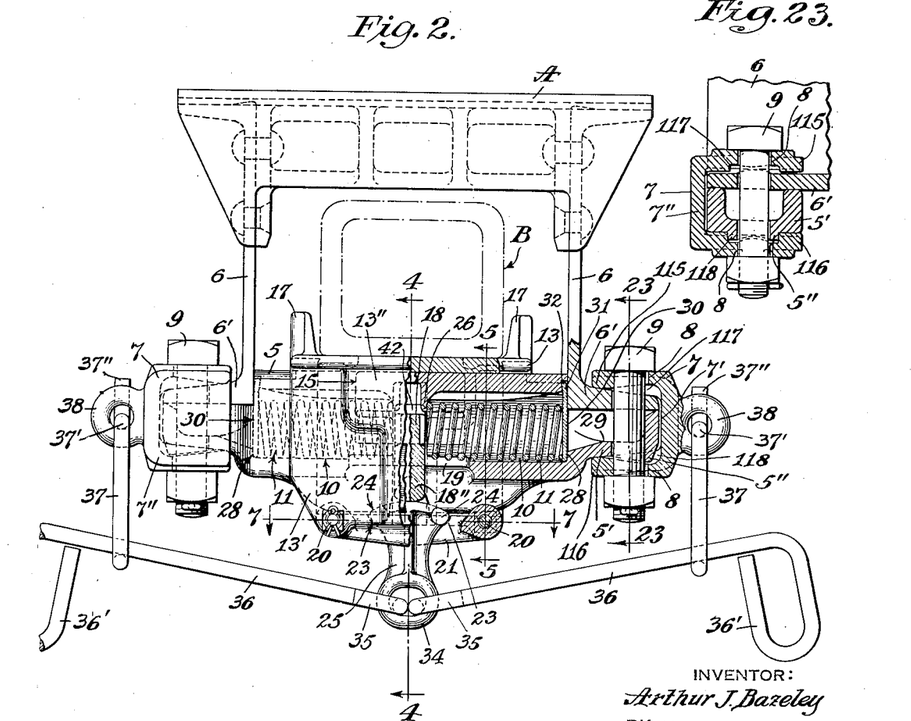
Fig. 2 is a view in front elevation, partly in vertical section, of the mechanism shown in Fig. 1.
Fig. 23 is a vertical sectional view on line 23—23 of Fig. 2.
Figure 14:
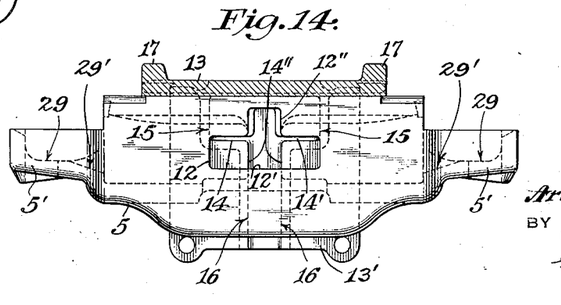
Fig. 14 is a detail front elevational view, partly in vertical section, of the coupler shifter and carrier castings in the position shown in Fig. 12.

Referring first to the embodiment of the invention shown in Figs. 1–14, there is shown at 5 a coupler carrier casting rigidly secured to the car structure A in any suitable manner. In the example shown said carrier-casting is fastened to the conventional depending car sills 6, 6, by tie blocks 7, 7; each tie block having a recess 7' for receiving an end extension 5' of said adjacent casting and a flange 6' of the adjacent sill, and having holes 8, 8 for the reception of a bolt 9 which also passes through holes in said end extension and flange. The recess 7' is formed by an outer end wall 7'' and the top and bottom walls 115, 116. The walls 115, 116 are further recessed as at 117, 118 to form pockets for receiving a projection 5'' extending downwardly from extension 5'. It is to be noted that the lower pocket only, to wit, pocket 118, receives the projection 5'', as shown in Fig. 23 and at the right of Fig. 2. The upper pocket 117 permits the tie block to be used on the opposite side of the carrier casting, where the position of the pockets becomes reversed. Thus the tie blocks are reversible and adapted for use on either side of the carrier. By means of this construction inward thrusts on the carrier casting in a direction longitudinally of the coupler are transmitted through lugs 5'', 5'' to tie blocks 7, 7 and hence to the ends of flanges 6', 6' of the car sills whereby shearing stresses on bolts 9, 9 are eliminated. It is of course desirable that the combined clearance between the bolt 9 and the holes in extension 5' and in the tie block be greater than the combined clearance between projection 5'' and the walls of recess 118 (or recess 117 as the case may be) plus the clearance between end wall 7'' and the end of sill flange 6' so that bolt 9 cannot be placed under any shearing stress. The carrier casting has a hollow interior providing longitudinally extending chambers 10, 10 for springs 11, 11 respectively. Said casting is further provided in each side-wall thereof with a slot 12 in the form of an inverted T (as shown particularly clearly in Fig. 14); each of said slots comprising a lower longitudinally extending portion 12' and portion 12'' extending upwardly from said horizontal portion midway between the ends thereof.

Slidably mounted upon the carrier-casting 5 is a coupler shifter-casting 13, comprising a top portion resting upon the top of said carrier, and depending side-wall 13', 13' which extend over the opposite side-walls of the carrier casting. Each of the side-walls 13', 13' of the shifter-casting has an interior T-shaped groove 14 therein, comprising an upper horizontal portion 14' and a depending vertical portion 14''. The grooves aforesaid are provided in outwardly extending portions 13'', 13'' of the respective side walls (Figs. 1, 2, 3, 4, and 7); and in Fig. 14 the ends of the upper horizontal groove portion 14' are indicated at 15, 15, while the end walls of the vertical groove portion 14'' are indicated at 16, 16.

The shank B of a coupler of conventional design rests on the top of the shifter-casting 13 between vertical flanges 17, 17 thereon as shown in Fig. 2.

An element 18 of T-formation is mounted in the carrier-casting. In the normal position of said element 18, shown in Figs. 2 and 4, its upper horizontal portion 18' rests upon the carrier-casting and extends through the lower horizontal slot portions 12', 12' thereof and thence into the lower vertical portions 14'' of the grooves in the shifter-casting. At the same time, the depending vertical stem 18'' of said element 18 extends downwardly through a slot 19 in the carrier-casting.

Figures 3, 4, 5, 6:
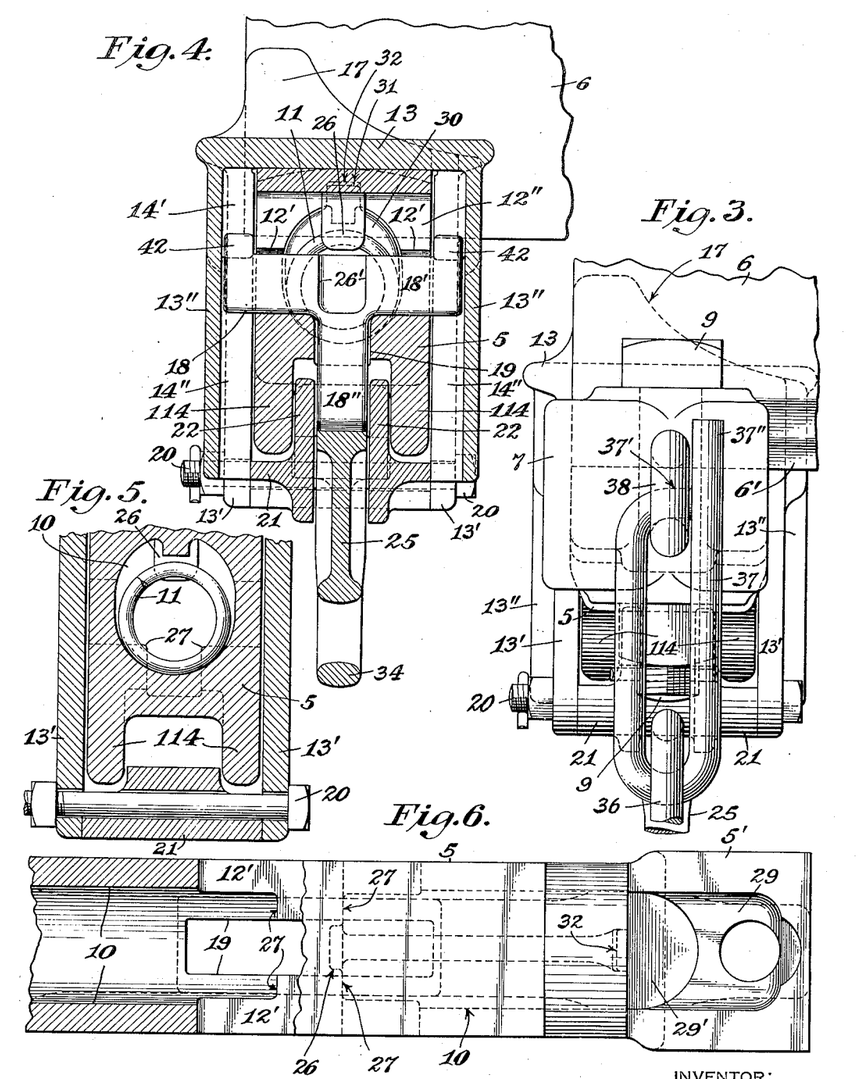
Fig. 3 is an enlarged end elevation, viewed from the right of Fig. 2.
Fig. 4 is an enlarged vertical section taken on line 4—4 of Fig. 2.
Fig. 5 is an enlarged vertical section taken on line 5—5 of Fig. 2.
Fig. 6 is an enlarged fragmentary detail plan view, partly in horizontal section, of the coupler carrier casting.

Fitted within the side walls 13', 13' of the shifter casting and secured thereto at the lower ends thereof, as by bolts 20, 20, is a bottom plate 21 provided with a pair of lugs 22, 22 extending upwardly therefrom. When the T-shaped element 18 is in its normal lowermost position shown in Fig. 4, the lower end portion of its depending stem 18'' is in the space between said lugs 22, 22. Said bottom plate 21 is further provided with concave bearing portions 23, 23 into which there are adapted to seat the trunnions 24, 24 of a release lever 25. In the normal position of the parts, both trunnions of said release lever seat in the respective bearing portions 23, 23 of the bottom plate 21, and the lower end of the stem 18'' of member 18 rests upon the middle of the convex top surface of said release lever, as shown in Fig. 2. Since, as above noted, the upper horizontal portion 18' of element 18 at this time projects through the horizontal slot portions 12', 12' of the carrier casting and into the lower vertical groove portions 14'', 14'' in the shifter casting, it will be seen that so long as said element 18 remains in this position it will participate in the movements of the shifter-casting in either direction along the carrier-casting and that, during such movements of the shifter-casting, said element 18 will slide in the horizontal slot portions 12', 12' aforesaid of the carrier-casting. At the same time the stem 18'' of the element 18 moves freely in the slot 19 of the carrier-casting, said slot being elongated as shown in Figs. 1, 2, and 6.

In the normal position of the parts, as shown in Fig. 2, the element 18 is positioned between the spring chambers 10, 10 of the carrier-casting. Each chamber 10, 10 has at one end an upper depending lug 26 and a pair of lower shoulders 27, 27, which lug and shoulders provide a bearing for one end of the spring 11 in the chamber. The opposite end of each chamber comprises a lower shoulder 28 for receiving pressure from the corresponding end of the spring. In each end extension 5' of the carrier casting there is provided a channel 29 which opens upwardly and communicates at one end with the interior of the adjacent spring chamber 10; whereby either spring 11 may be readily inserted into its respective chamber 10 by simply passing said spring downwardly into the open channel 29 and thence pushing it longitudinally through said channel and into said chamber. The bottom portion 29' of said channel adjacent the associated chamber 10 slopes downwardly as shown and thus facilitates the entry of the spring into the chamber. When fully inserted into its chamber, each spring bears at one end against the lug 26 and shoulders 27, 27 at the further end of the chamber and at its other end against the shoulder 28. To enable the carrier-iron and inserted springs to be expeditiously transported to the place of use without danger of loss of the springs there are provided shims 30, 30, each of which is inserted between the shoulder 28 of the respective chamber 10 and the corresponding end of the spring 11. A tongue 31 on each shim extends upwardly and is engaged in a recess 32 in the upper wall of the associated chamber 10 when the lower part of the shim is inserted between the spring and shoulder 28, whereupon the metal on opposite sides of said recess 32 may be peened over said shim with consequent firm retention of the latter in position. The carrier-casting, together with the springs, the element 18, and the shims 30, may now be readily transported to the place of use. It may be noted that the element 18 is positioned in the carrier-casting prior to insertion of the springs; and that said element may be readily inserted into said carrier-casting by turning said element to bring its horizontal portion 18' into alignment with the slot 19, then moving said element upwardly in said slot until its horizontal portion is above the slot, and thereafter turning said element into the position shown in Fig. 4. The springs 11, 11 are then inserted as above described, followed by insertion of the shims 30. When the carrier casting is positioned between the sills 6, 6 as shown in Fig. 1 the lower portions of said sills constitute bearings for the respective shims 30 and receive the pressure imparted to said shims by the springs 11.

It has been noted above that the element 18, when in its normal lowered position shown in Figs. 2 and 4, is moved along the slot portions 12', 12' of the carrier-casting whenever the shifter-casting is moved by the coupler in either direction from the position shown in Fig. 2. Such movement of the element 18 in either direction from its central (Fig. 2) position along the carrier-casting slots 12', 12' compresses the corresponding one of the springs 11, 11, whereby movement of the shifter-casting from its central position shown in Fig. 2 is opposed by a force which increases with the extent of departure of said shifter-casting from said central position. Upon cessation of the force which caused shifting of the coupler and shifter casting, the compressed spring aforesaid acts through the element 18 to return the parts to their Fig. 2 position.

It will be observed that the element 18, when in the central position shown in Fig. 2, does not receive pressure from either of the springs 11, 11, but that at this time the ends of said springs adjacent said element bear against the lugs 26 and shoulders 27 in their respective chambers 10, 10. When, however, the element 18 is moved from said central position by the shifter-casting, said element engages one or the other of the springs 11 and compresses the same. In the aforesaid movement of the element 18, both the depending stem 18" and the horizontal portion 18' thereof engage the spring 11 which lies in the path of movement thereof, as will be clear from Fig. 4.

It will, in short, be apparent from the foregoing description that so long as the element 18 is in its lowered position shown in Figs. 2 and 4, any movement of the shifter-casting 13 from its central position (Fig. 2) meets with a force which urges said casting back into said central position, the amount of this restoring force being proportional to the extent of movement of said casting from said position. My invention further enables the centralizing springs to be expeditiously disabled or rendered ineffective, when desired, and the shifter-casting and coupler to be shifted manually in either direction from central position, as when it is desired to bring the coupler into a laterally displaced position suitable for coupling on a curve. This is accomplished through actuation of the disabling or release lever 25, as will now be described.

The lever 25 is provided at its lower end with an eye 34 engaged by the hook portions 35, 35 of a pair of operating rods 36, 36, respectively. Each of the latter may be supported by loop element 37 mounted in an eye 38 integral with a corresponding one of the blocks 7. Through said rods 36, 36, the lever 25 may be operated from either side of the car. Assuming, now, that it is desired to shift the casting 13, together with the coupler, to the right of its central position, the right hand operating rod is pulled outwardly. When said rod is drawn into the position shown in Fig. 12 the lever 25 is rocked about its left hand trunnion 24 and the element 18 is raised into such position that its horizontal or transverse upper portion 18' is in the upper vertical slot portions 12", 12" of the carrier-casting 5, and extend also into the upper horizontal groove portions 14' of the shifter-casting 13. In this raised position of the element 18 the shifter-casting may be moved along the carrier-casting without opposition by either of the springs 11, since the element 18 is now out of position for abutment by the walls of the vertical slots or grooves 14" in the shifter-casting and instead extends within the upper horizontal grooves 14' thereof. The length of the horizontal groove or slot portions 14' in the shifter-casting is such as to enable said casting to be shifted freely into engagement with either of the sills 6 so long as element 18 is in its raised position aforesaid.

Figure 12:
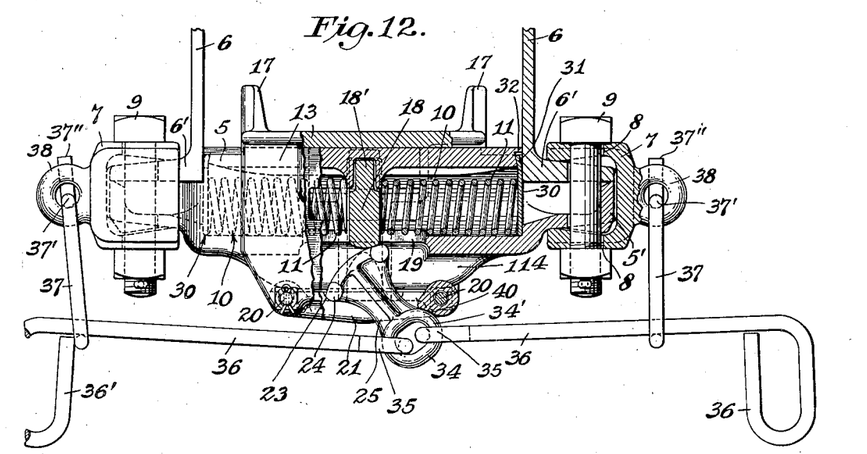
Fig. 12 is a view similar to Fig. 2, but showing the right hand operating rod drawn partly outward with consequent raising of the T-shaped centralizing-control element into a position permitting manual shifting of the coupler.
Figure 13:
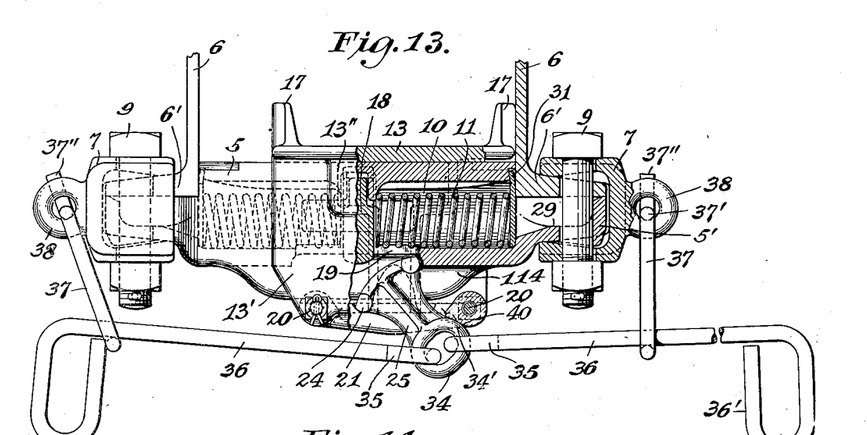
Fig. 13 is a view similar to Fig. 2 but showing the right hand operating rod pulled further outwardly, moving the coupler shifter casting into its extreme right hand position.

When the lever 25 is in the position shown in Fig. 12, said lever is engaged with the shifter-casting not only through the cooperation of its left hand trunnion 24 with the associated bearing recess in the bottom plate 21, but also through the engagement of the outer surface 34' of eye portion 34 with the under surface 40 on said plate 21. Now, upon further outward movement of the right hand rod 36 the lever 25, in cooperation with said plate 21, draws the shifter-casting 13, together with the coupler, to the right of the central position thereof, whereby said casting and coupler may be brought to the position shown in Fig. 13, which illustrates approximately the extreme right hand position of the casting. During said movement of the shifter-casting and coupler by operation of the right hand rod 36, the springs 11, 11 are out of action; since, as above noted, the element 18 is in such position that it will have no movement imparted thereto by the shifter-casting, but instead is in the horizontal portions of the shifter-casting grooves 14, permitting free movement of said casting in response to manual pulling of the operating rod.

Similarly, when it is desired to shift the coupler to the left of its central position, the left hand operating rod 36 is drawn outwardly, with consequent rocking of the lever 25 about its right hand trunnion and raising of the element 18 into its Fig. 12 position, whereby upon further pulling of said left hand rod 36, the shifter-casting and coupler are drawn to the left.

The rods 36 are provided with looped outer ends 36' for convenience of manipulation. Each of the loop-shaped supporting members 37 has a horizontal end portion 37' which engages and rests upon the inner surface of the eye portion 38; and said members 37 are further each shown with an upward vertical extension 37" at the other end thereof, which extension is adapted to bear against a side of the eye 38 to limit swinging of said member 37 in one direction.

Figures 7, 8, 9, 10, 11:
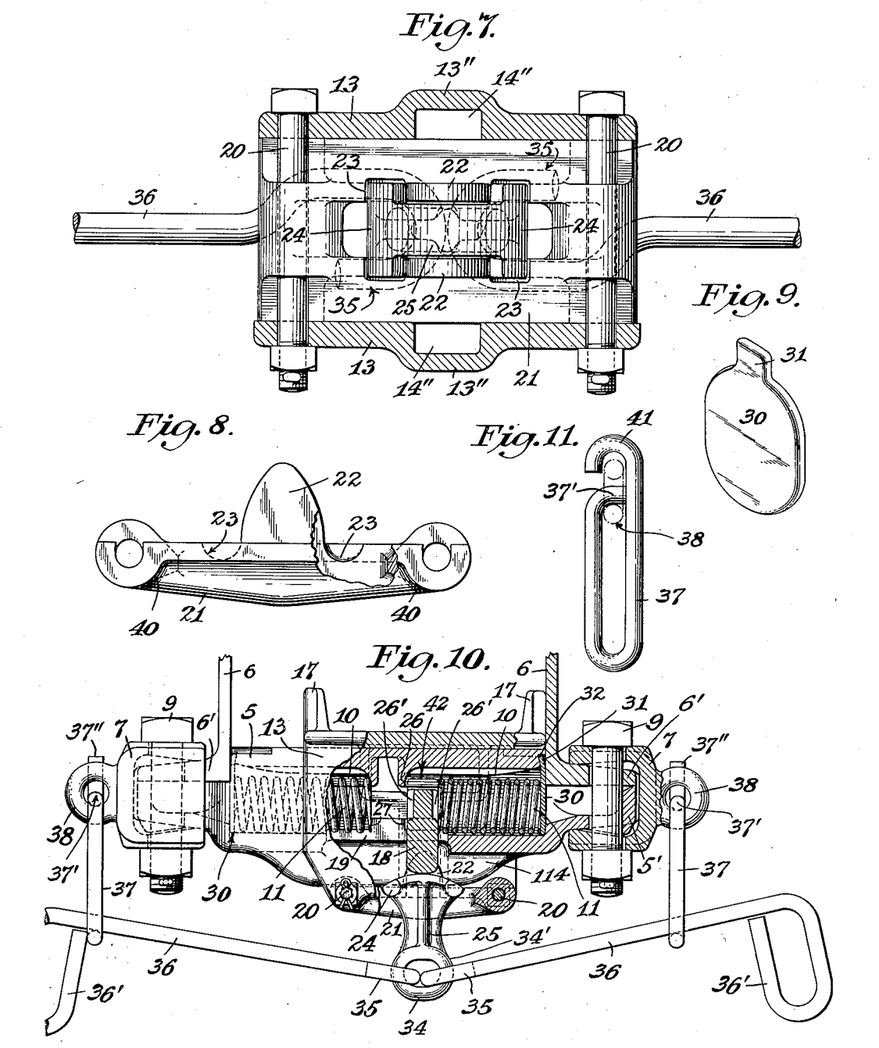
Fig. 7 is an enlarged horizontal section taken on line 7—7 of Fig. 2, showing the release lever and the supporting plate secured to the lower ends of the coupler shifter casting.
Fig. 8 is a detail view of the aforesaid supporting plate.
Fig. 9 is a perspective view of a shim employed in conjunction with one of the springs in the carrier casting.
Fig. 10 is a view similar to Fig. 2, but showing the parts in the position which they assume when actuated by movement of the coupler to the right.
Fig. 11 is a detail view showing a modification of the looped member which supports one of the operating rods for manual shifting of the coupler.

In Fig. 11 there is shown a modified form of loop-shaped supporting member 37, wherein the end of said member opposite the portion 37' is bent over the top of the eye 38 to form a hook-shaped portion 41, cooperating with opposite sides of the eye 38 to limit swinging of the member 37 with respect to said eye in either of opposite directions.

The ends of the horizontal or transverse arm 18' of element 18 are provided with upwardly projecting lugs 42, 42 which overlap the sides of the carrier-casting immediately above the vertical slot portions 12", 12" when said horizontal arm 18' is engaged in said vertical slot portions. These lugs prevent tipping of the ends of said horizontal arm 18' one below the other, and binding thereof between said walls of the shifter-casting, during the raising of the element 18 from its lowermost position and the descent of said element from its uppermost position. It will furthermore be noted that the upper portion of the element 18 is recessed on opposite sides as indicated at 26′, 26′ (Figs. 4 and 10) for receiving the lugs 26, 26 of the carrier-casting when said element 18 is raised into its upper position.

In Figures 15–22 of the drawings there is shown another embodiment of my invention, which has been developed particularly for passenger service. In this embodiment the carrier-casting is shown at 43 and is provided with upward extensions 44 at the ends thereof. Said casting is shown as depending from the car end sills, to which it is secured by bolts 45 passing through flanges 46 of said extension 44. Slidably mounted on the carrier casting is the coupler shifter-casting 47 having upwardly extending flanges 48, 48 between which there is received the coupler shank B. The latter rests upon the wear plate 49 on the shifter casting. The steam line 50 of conventional type is shown attached to the shifter-casting, through the medium of bracket 51, clamp 52, and bolts 53; while the air brake line 54 and signal air line 55 may be fastened to said shifter casting by clamp 56 and bolts 57, in in cooperation with bracket 58.

Figure 15:
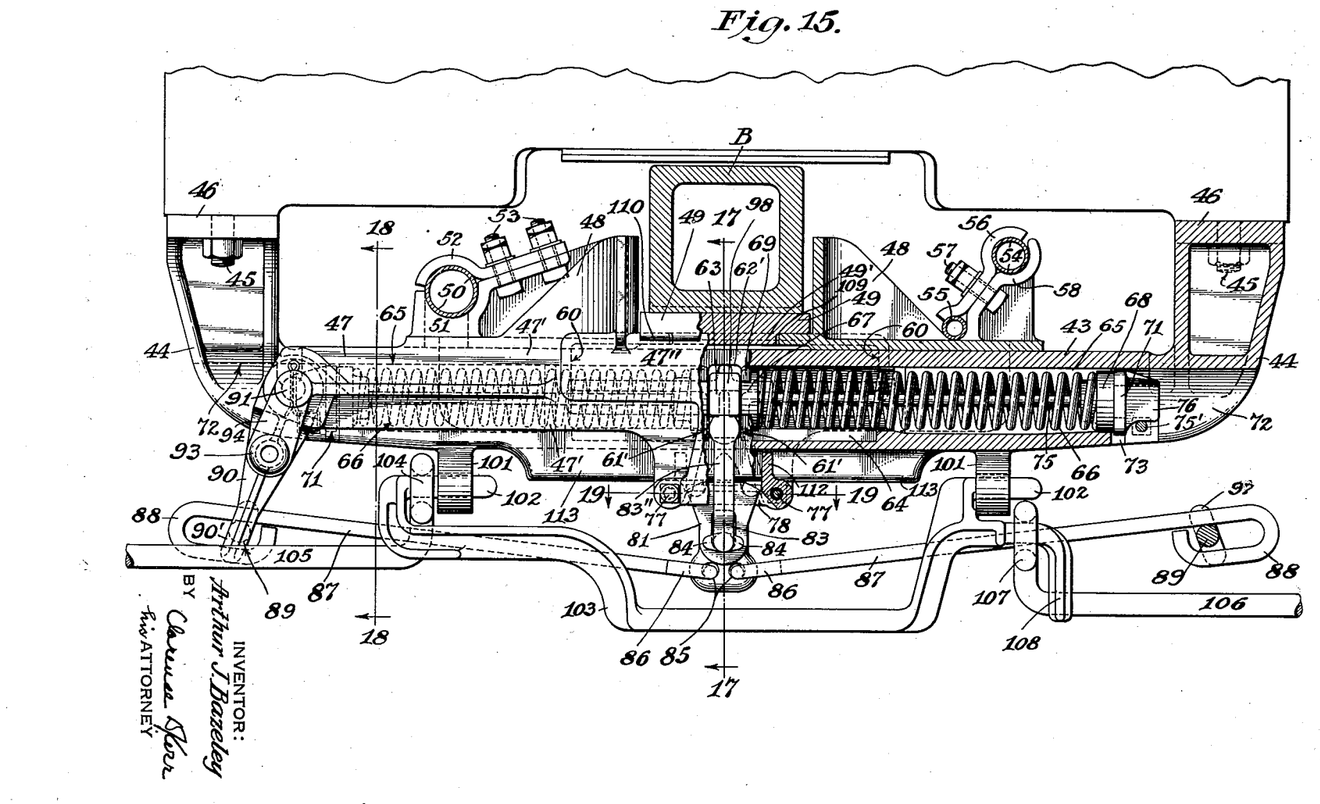
Fig. 15 is a view in front elevation, partly in vertical section, showing another embodiment of the invention, especially adapted for passenger service, the parts being in central position.

The shifter-casting 47 comprises a top portion which rests upon the carrier-casting, and depending side portions 47′, 47′, which overlie the sides of said carrier-casting. Each of said sides 47′, 47′ has on the interior thereof a slot or groove 59 of general T-formation, and comprising an upper horizontal portion 59′ and a lower vertical portion 59″. As in the embodiment shown in Figures 1–14, the interior, slots or grooves 59 are provided by portions 47″ of the walls 47′ which portions extend outwardly or laterally. In Figure 15, the end walls of the horizontal portions 59′ of the grooves 59 are indicated at 60, and the end walls of the vertical portions 59″ at 61 (see also Figs. 16, 19, 20, and 21). It will be noted that the walls 61 of each groove portion 59″ first extend downwardly substantially vertically from the horizontal portions 59′ (to substantially the points indicated at 61′, 61′ in Figs. 15 and 20) and thence diverge downwardly, for a purpose to be hereinafter more specifically set forth.

The carrier-casting 43 has in each side thereof a horizontal slot 62 (Fig. 16) having intermediate its ends an upward extension 62′. An element 63, comprising a horizontal or transverse portion 63′ and a depending vertical leg 63″ is mounted in the carrier-casting (as shown particularly in Figs. 15–17) so that normally its horizontal portion 63′ extends through the horizontal slots 62 and into the vertical grooves 59″ in the shifter-casting 47. The portions of said vertical grooves 59″ into which the ends of the horizontal member 63′ extend are the upper, straight, non-divergent portions of said grooves, above the points 61′ above mentioned. The leg 63″ depending from the horizontal portion 63′ of the member 63 projects at the same time into a groove 64 extending longitudinally in the bottom of the carrier-casting. The bottom of said carrier-casting is closed throughout the greater portion of its length.

The carrier-casting 43 includes interior chambers 65, 65 which contain springs 66, 66, respectively. Each of said springs is interposed between a pair of spring caps 67, 68 in the corresponding chamber. At its inner end each chamber is provided with a depending lug 69 and a pair of lower shoulders 70, 70 (similar to the lugs 26 and shoulders 27 of the construction shown in Figs. 1–14), which lug and shoulders form bearings for engagement by the spring cap 67 in said chamber. Each of the spring caps 68 bears against a closure member 71 which is inserted into the outer end of the corresponding chamber 65. In this connection it may be noted that each chamber 65 opens outwardly into an open, downwardly facing channel 72 in the adjacent end of the carrier-casting; and that the end portions of the casting just beyond the respective spring chambers 65 are each provided with grooves 73, 73 in the side walls thereof into which grooves are adapted to fit the side extensions 74, 74 (Fig. 18) of the corresponding closure member 71.

Each spring 66 and the associated caps 67, 68 are held together as a unit by a bolt 75 which extends through said caps and spring, as shown; and each such spring unit may be inserted with facility into its chamber 65 by simply passing the unit upwardly into the channel 72 which communicates with said chamber and thence pushing the unit longitudinally through the open end of the chamber until the cap 67 engages the lug 69 and shoulders 70 at the inner end of the chamber. Upon now passing the closure member 71 upwardly in the channel 72, with the side extensions 74 of said member in engagement with the grooves 73, said member 71 may be moved into the position wherein it closes the outer end of said chamber and provides an abutment for the spring cap 68. Upon now inserting a bolt 75′ through the opposite sides of the casting 43 and beneath the end extensions 76 of the closure member 71 the latter is retained in its operative position. It will be apparent that the springs 66 may be under no compression or under a slight initial compression, as desired, when inserted in their chambers 65 (as is also true with respect to the springs 11 in the embodiment shown in Figs. 1–14). In the normal position of the element 63 shown in Figures 15–17 said element receives no pressure from the springs, even though they be under initial compression, since at such time said springs bear through their inner caps 67 against the lugs 69 and shoulders 70 of their respective chambers 66. The element 63 may be inserted into the carrier-casting by turning it into horizontal position, and then passing it through one of the horizontal slots 62 until the stem 63″ of said element 63 comes over the channel 64, whereupon said element is turned into its vertical position shown in Figure 17, with its stem aforesaid in engagement with said channel.

Figures 16, 17, 18, 19:
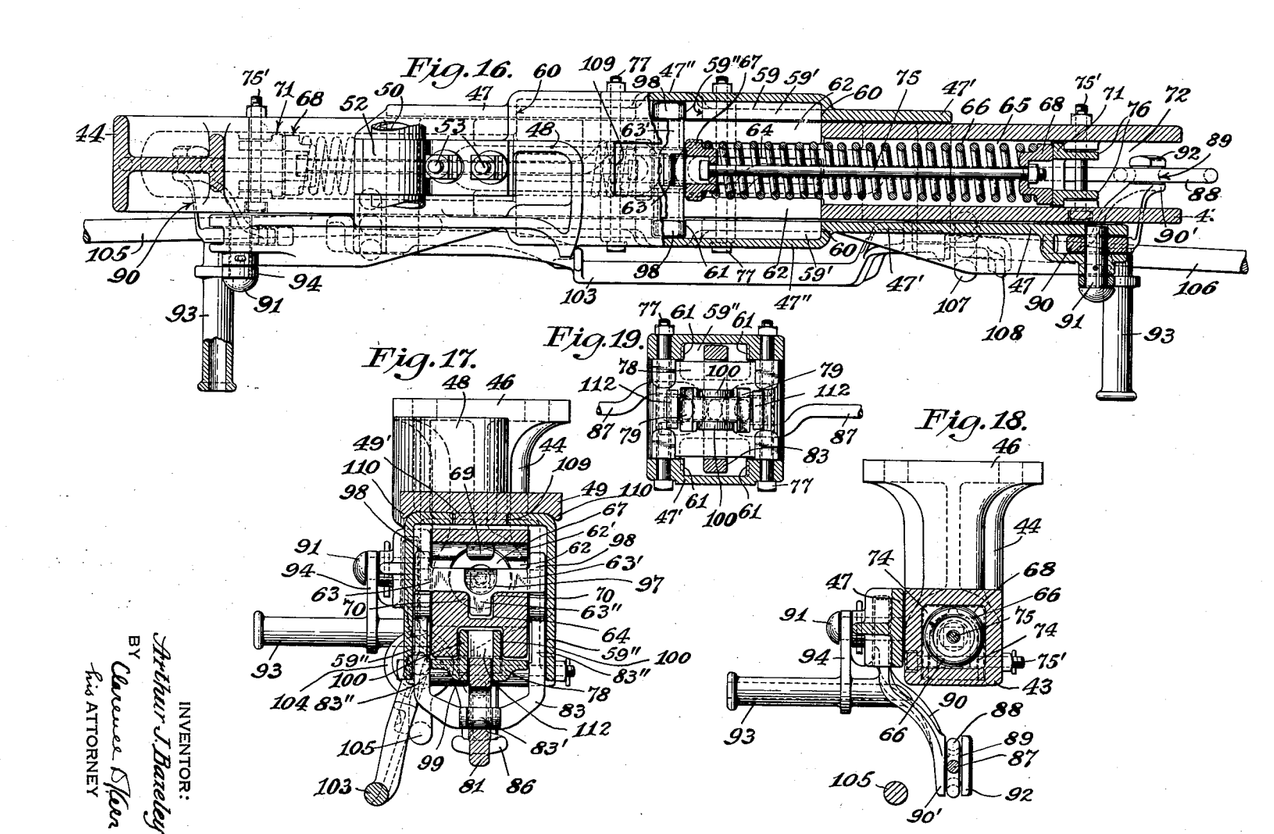
Fig. 16 is a plan view, partly in horizontal section, of the parts shown in Fig. 15.
Fig. 17 is a central vertical sectional view taken on line 17—17 of Fig. 15.
Fig. 18 is a vertical sectional view on line 18—18 of Fig. 15.
Fig. 19 is a horizontal sectional view on line 19—19 of Fig. 15.
Figure 22:
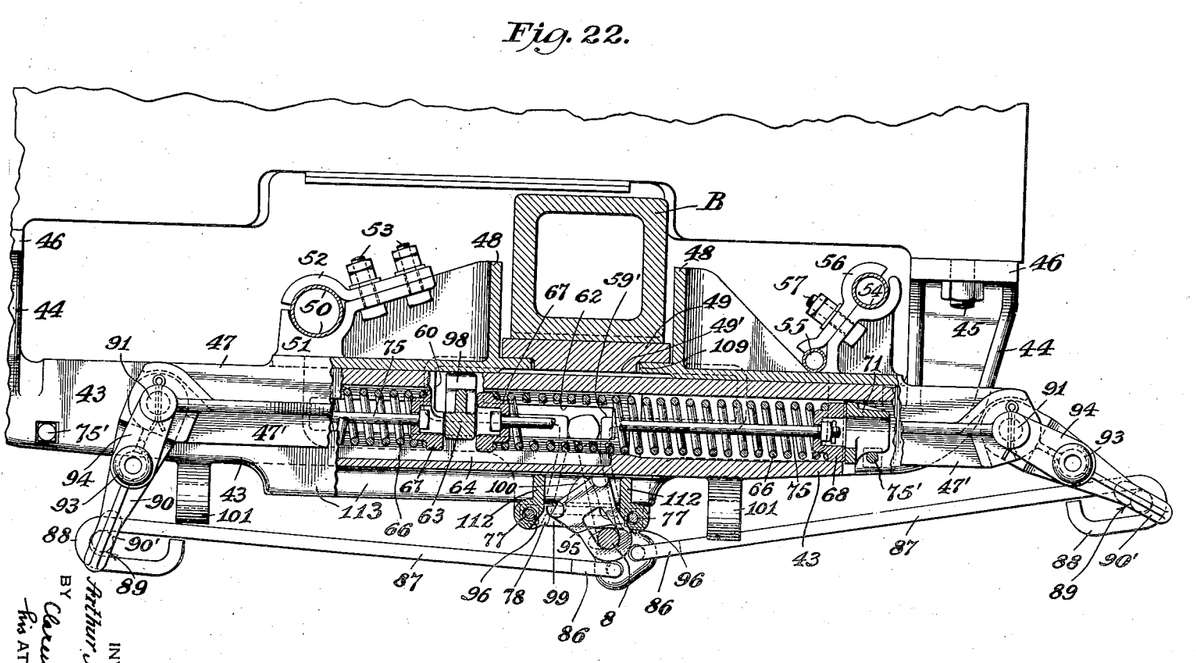
Fig. 22 is a view similar to Fig. 21, but with the right hand operating rod pulled further outward with consequent operation of the coupler shifter casting and coupler.

Secured by bolts 77 to downward extensions of the side walls 47′ of the shifter casting is a bottom plate 78, provided with recessed portions 79, 79 (Fig. 20) adapted to receive trunnions 80, 80 at the upper end of a neutralizing or release lever 81. Said lever 81 has a slot 82 through which there is passed the horizontal portion 83′ of a bail 83, the vertical arms 83″, 83″ of which bail extend into the vertical groove portions 59″, 59″, in the side walls of the shifter casting. The portions of the grooves 59″ into which the aforesaid vertical bail arms extend are the downwardly flaring or diverging portions of said grooves, which enable the bail arms to be rocked through the desired extents. Pairs of lugs 84, 84 extend outwardly from opposite sides of the bail and engage opposite sides of the lever 81, for centering the bail with respect to said lever and eliminating substantial side play in the operation of said bail and lever. Near its lower end, the lever 81 is provided with openings 85, 85, which receive the hooked or looped ends 86, 86 of operating rods 87, 87 respectively. The upper ends of the bail arms 83″ are somewhat widened as shown in Figures 15, 17, and 22, and underlie the opposite ends of the horizontal arm 63' of the member 63.

Each operating rod 87 is provided at its outer end with a looped portion 88 which embraces and is pivotally mounted on a bearing extension 89 of an arm 90 pivotally mounted on a pin 91 on the shifter-casting. Said bearing extension 89 of the arm 90 may as shown in Fig. 18, project from a flattened portion 90' of said arm and may have a flange 92, said loop portion 88 of the lever 87 being positioned on said extension 89 between said flattened portion 90' and flange 92 and thus being prevented from being accidentally withdrawn from engagement with said extension 89. Projecting laterally from the arm 90 is a handle 93, which may have an upward extension 94 pivotally supported on the pin 91.

Figure 20:
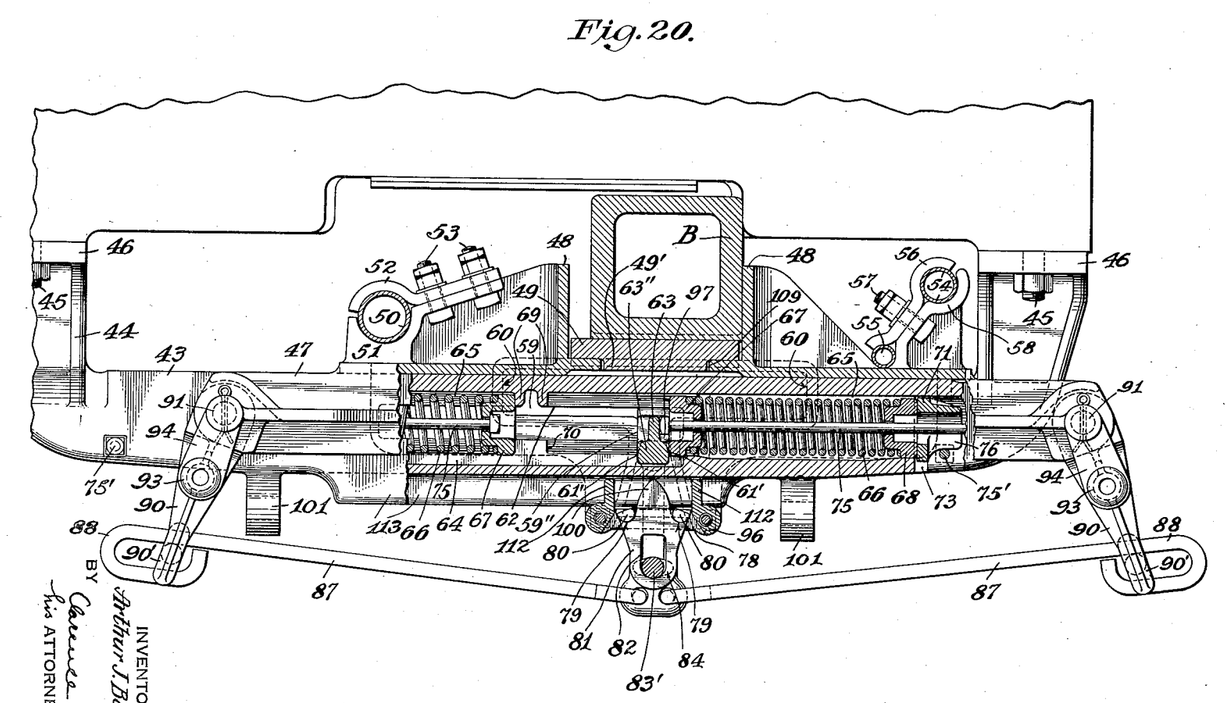
Fig. 20 is a view similar to Fig. 15 but showing the parts in the position assumed when shifted to the right by movement of the coupler.

In Figure 15, the operating rods 87, release lever 81, bail 83, and element 63, are in their normal position and the shifter-casting 47 is in its normal central position. If, now, the shifter-casting is moved by the coupler in either direction from said central position, the element 63 is carried with said shifter casting, since said element is engaged at opposite ends of its horizontal portion 63' in the straight portions of the vertical grooves 59'' in said casting. Upon movement of said shifter-casting and element 63 away from said normal position, said element engages the cap 67 of the spring 66 which lies in the direction of movement thereof and compresses said spring, whereby the movement of the shifter-casting away from its central position is opposed by a force commensurate with the displacement of said casting from said position. Upon cessation of the force which caused the coupler and casting 47 to shift, the compressed spring, acting through cap 67 and element 63, returns said casting to its normal central position. In Figure 20, the casting 47 is shown shifted by the coupler A into approximately its extreme right hand position, carrying the element 63 to the right and compressing the right hand spring 66 to the maximum extent. It will be noted that the groove 64 in the bottom of the carrier-casting opens upwardly into the spring containing chambers 65, 65 as is clearly shown in Figs. 15 and 20, and that said groove guides the depending stem 63'' of element 63 during movement of the latter in the compressing of either of the springs.

If it is desired to shift the casting 47 manually from its normal central position to bring the coupler into a position for coupling on a curve, the appropriate one of the rods 87, 87 is drawn outwardly by pulling outwardly on the corresponding handle 93. Thus, in Fig. 21, wherein the shifter-casting 47 is in normal position, the right hand handle 93 and rod 87 have been drawn to the right. The lever 81 is thereby rocked about its left hand trunnion 80, with consequent raising of the bail 83 through the engagement therewith of the lower end of slot 82 in said lever. Such raising of said bail lifts the element 63 into a position wherein the ends of its horizontal or transverse arm 63' are received within the horizontal grooves 59' in the side walls of the shifter casting and wherein at the same time said transverse arm is engaged within the vertical slots 62' of the carrier casting. The element 63 is thus out of position for transmitting any spring pressure to the shifter-casting, and the latter is free to be moved in either direction along the carrier casting without resistance by either of the springs 66. Upon now pulling further outwardly on the right hand handle 93 the shifter casting and coupler may be shifted to the right as far as desired. In Fig. 22 said casting is shown shifted into approximately its extreme right hand position through actuation of the handle 93 at the right. It will be noted that the rocking of the release lever 81 into the position shown in Figure 21 has brought the side 95 of said lever into engagement with the under surface 96 on the plate 78 secured to the shifter casting, which surface 96 forms an abutment for said lever 81. As has also been noted, the handle 93 and arm 90, to which the rod 87 is connected, are mounted on the shifter casting. The force imparted by the handle 93 to the shifter-casting for moving the latter along the carrier-casting is applied to said shifter-casting manually at the pivot 91, and only a comparatively small portion of this force is applied to the casting at the surface 96. Thus the operating rod 87 is subjected to only a comparatively slight strain in the manual shifting of the shifter-casting, and the possibility of undesirable straining thereof is avoided.

Figure 21:
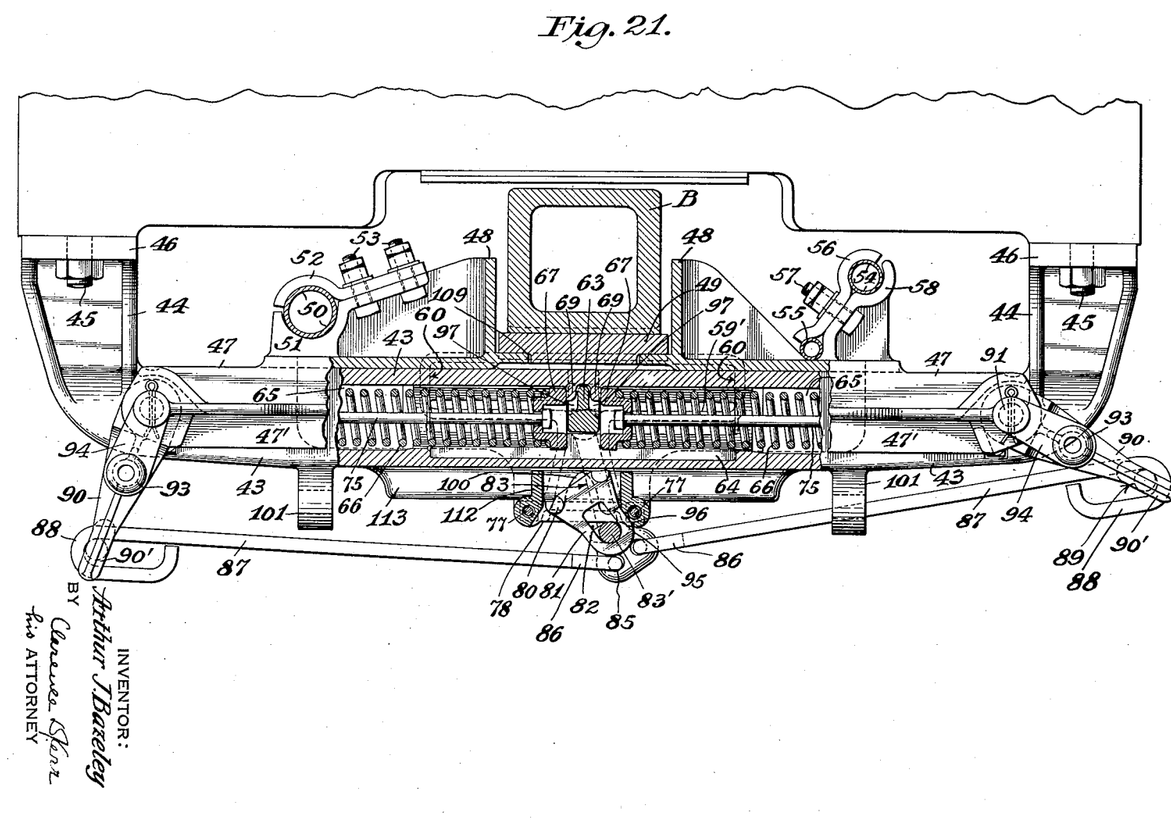
Fig. 21 is a view similar to Fig. 15, with the right hand operating rod pulled partly outward, and the centralizing-control element in raised position permitting manual shifting of the coupler.

The element 63 is provided on opposite sides with recesses 97 into which recesses the downwardly extending lugs 69 of the shifter-casting extend when said element 63 is raised into the position shown in Fig. 21. Also these recesses 97 are adapted to receive the heads of the bolts 75 during movement of the element 63 with the shifter-casting along the carrier-casting, as illustrated in Fig. 20. The ends of the horizontal arm 63' of element 63 are provided with upwardly extending projections 98, which, when said element is raised into the position shown in Fig. 21, overlap the side walls of the carrier-casting 43 above the vertical slot 62'. Said projections 98 cooperate with the inner grooves 59 of the shifter-casting to prevent tipping of either end of said arm during downward movement of the element 63 from its uppermost position; thus eliminating objectionable binding of the ends of said horizontal arm between the side walls of the shifter casting. Furthermore, the projections 98, in cooperation with the bail arms 83'', 83'' assure vertical movement of said element 63 without tilting or rocking thereof.

The release lever 81 extends downwardly through a slot 99 in the bottom plate 78 as shown in Figs. 15, 17, 19, and 20. Projecting upwardly from said plate are lugs 100, 100 which serve as guides for the release lever during rocking thereof about either of its trunnions, as illustrated in Figs. 21 and 22.

The carrier casting 43 has depending therefrom a pair of integral lugs 101, 101, which lugs receive trunnions 102, 102 integral with and projecting from a bail 103 for operating the lock of the coupler. One of the trunnions 102 has pivotally mounted thereon the looped end 104 of an operating rod 105. An operating rod 106 for operating the bail from the opposite side of the carrier has a looped end 107 pivotally mounted on a portion of said bail below the other trunnion 102, said rod being adapted to engage an arm 108 depending from said bail for actuating the latter. The bail 103, with its trunnions, lugs, and operating rods 105, 106 is disclosed in my co-pending application Serial No. 541,150, filed June 1, 1931, which has eventuated in Patent No. 2,051,361, dated August 18, 1936, and the operation of said bail and associated operating rods for actuating the lock is the same as disclosed in said application.

While the coupler shank B might, if desired, be fitted between the lugs 48, 48 of the shifter-casting, without any clearance between said shank and lugs, it will be noted that clearance is shown therebetween. This clearance enables the coupler to angle freely without resistance by the springs 66 throughout the gathering range of the coupler. Similar comments apply to the coupler shank B in the embodiment shown in Figs. 1–14.

The wear plate 49 is shown provided with a depending extension 49' which is received within an opening 109 in the top of the shifter casting for aiding in maintaining the wear plate in position on said casting. Lugs or flanges 110 on opposite ends of the wear plate cooperate with adjacent surfaces on the shifter casting (see Figs. 15 and 17) to aid in retaining the wear plate in position on said casting.

Since the element 18 of the form of the invention shown in Figs. 1–14, and the element 63 of Figs. 15–22 each control the effectiveness of the associated springs for centralizing the shifter-casting, each of said elements may be termed a centralizing-control element.

The bottom plate 78 may advantageously be provided, as shown in Figs. 15, 17, 20, 21, and 22, with lugs 112, 112, extending upwardly therefrom within the space between the depending flanges 113, 113 of the carrier casting. These lugs prevent pebbles, cinders or the like from passing through the space between said flanges and into the mechanism mounted between said flanges on said bottom plate. It will, of course, be clear that similar lugs may be provided on the bottom plate 21 of Figs. 1–14 for extending between the depending flanges 114, 114.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. Apparatus for controlling the lateral displacement of a railway car coupler, said apparatus comprising a carrier member, a shifter member mounted for movement upon said carrier member, and adapted to support a coupler, spring means on said carrier member, an element in said carrier member and cooperating with said spring means and shifter member for enabling said spring means to oppose movement of said shifter member from normal central position, and manually operable means for shifting said element to a position in said carrier member enabling said shifter member to be displaced from normal position without opposition from said spring means.

2. Apparatus for controlling the lateral displacement of a railway car coupler, said apparatus comprising a shifter member for supporting a coupler, a carrier member slidably supporting said shifter member, spring means, an element cooperating with said shifter member and said spring means for enabling said spring means to oppose movement of said shifter member from normal central position and to urge said member toward normal position upon displacement therefrom, and means supported by one of said members for manually shifting said element to a position relative to said shifter member wherein said spring means is rendered ineffective to oppose displacement of said shifter member from normal position.

3. Apparatus for controlling the lateral displacement of a railway car coupler, said apparatus comprising a shifter member for supporting a coupler, a carrier member slidably supporting said shifter member, spring means on said carrier member, means providing a base of reaction between said spring means and said shifter member upon movement of said shifter member in either direction from its normal central position for enabling said spring means to oppose said movement, and manually operable means permanently associated with said carrier member for rendering said base of reaction ineffective relative to said shifter member and thereby enabling said shifter member to be displaced from its central position without opposition from said spring means.

4. Apparatus for controlling the lateral displacement of a railway car coupler, said apparatus comprising a shifter member for supporting a coupler, a carrier member upon which said shifter member is slidably mounted, spring means on said carrier member, a slidable element on said carrier member and cooperating with said shifter member and said spring means for transmitting pressure from said spring means to said shifter member upon displacement of the latter from its normal central position for enabling said spring means to urge said shifter member to said normal position, and manually operable means comprising a rockable release lever for sliding said element into a position out of pressure transmitting relation to said spring means and shifter element to enable the latter to be displaced freely from said normal position.

5. Apparatus for controlling the lateral displacement of a railway car coupler, said apparatus comprising a shifter member for supporting a coupler, a carrier member upon which said shifter member is slidably mounted, springs on said carrier member, an element interposed between said springs, means normally engaged by said element for causing the latter to be moved with said shifter member during displacement thereof in either direction from normal central position and thereby storing energy through said element in a corresponding one of said springs, and manually operable means for shifting said element to another position between said springs out of position for movement with said shifter member to enable the latter to be displaced from normal position without storing energy in either of said springs.

6. Apparatus for controlling the lateral displacement of a railway car coupler, said apparatus comprising a shifter member for supporting a coupler, a carrier member upon which said shifter member is slidably mounted, spring means on said carrier member, a shiftable element cooperating with said spring means, means comprising a vertical groove in said shifter member for receiving said element when the latter is in normal position for compelling said element to move with said shifter member for causing energy to be stored in said spring means by said element upon displacement of said shifter member in either direction from normal position, and manually operable means for shifting said element out of engagement with said vertical groove to enable the shifter casting to be moved from normal position without causing said element to store energy in said spring means.

7. Apparatus for controlling the lateral displacement of a railway car coupler, said apparatus comprising a shifter member for supporting a coupler, a carrier member upon which said shifter member is slidably mounted, a centralizing-control element, means on said shifter member cooperating with said element for causing the latter to move with said shifter member upon displacement thereof in either of opposite directions from normal central position, spring means cooperating with said element for opposing movement of said shifter member during said movements thereof, and means comprising a lever mounted on said shifter member below said element for shifting the latter to an inactive position.

8. Apparatus for controlling the lateral displacement of a railway car coupler, said apparatus comprising a shifter member for supporting a coupler, a carrier member upon which said shifter member is slidably mounted, said shifter member having depending side walls overlapping the carrier member, each of said side walls having a groove comprising an upper horizontal portion and a depending vertical portion, said carrier member having slots each comprising a horizontal portion in registry with the vertical portion of a corresponding one of said grooves, and each of said slots also comprising an upwardly extending vertical portion, a centralizing-control element in said carrier member and comprising a transverse arm extending through the horizontal portions of the slots in the carrier member and into the vertical groove portions in the shifter member when said centralizing-control element is in normal position, springs on said carrier member cooperating with said element for opposing movement of said shifter member away from a normal central position, and manually operable means for shifting said element out of engagement with the vertical groove portions of the shifter member and into engagement with the horizontal groove portions thereof for enabling the shifter member to be operated without opposition by said spring means.

9. Apparatus for controlling the lateral displacement of a railway car coupler, said apparatus comprising a shifter member for supporting a coupler, a carrier member upon which said shifter member is slidably mounted, said shifter member having depending side walls overlapping the carrier member, each of said side walls having a groove comprising an upper horizontal portion and a depending vertical portion, said carrier member comprising longitudinally extending spring housing chambers and springs in said chambers, said carrier member also having slots each comprising a horizontal portion in registry with portions of said chambers, and also in registry with the vertical portion of a corresponding one of said grooves in said shifter member, and each of said slots in said carrier member also comprising an upwardly extending vertical portion, a centralizing control element positioned in said carrier member between said springs and comprising a transverse arm extending through the horizontal portions of the carrier member and into the vertical groove portions in the shifter member when said centralizing control element is in normal lowered position, said centralizing control element being thereby adapted to be moved with said shifter member in either direction from the normal central position thereof and to store energy in a corresponding one of said springs, and manually operable means for shifting said element out of engagement with the vertical groove portions of the shifter member and into engagement with the horizontal groove portions thereof for enabling the shifter member to be operated without opposition by said spring means.

10. Apparatus for controlling the lateral displacement of a railway car coupler, said apparatus comprising a shifter member for supporting a coupler, a carrier member upon which said shifter member is slidably mounted, said shifter member having depending side walls overlapping the carrier member, each of said side walls having a groove comprising an upper horizontal portion and a depending vertical portion, said carrier member having slots each comprising a horizontal portion in registry with the vertical portion of a corresponding one of said grooves, and each of said slots also comprising an upwardly extending vertical portion, a centralizing control element in said carrier member and comprising a transverse arm extending through the horizontal portions of the slots in the carrier member and into the vertical groove portions in the shifter member when said centralizing control element is in normal position, said element being thereby adapted to be moved by said shifter member whenever the latter is moved in either direction from a normal central position, springs on said carrier member and disposed on opposite sides of said element for cooperation therewith to oppose movement of said shifter member away from said normal central position, said element further comprising a depending stem extending into a guiding slot in said carrier member, and manually operable means for shifting said centralizing control element out of engagement with the vertical groove portions of the shifter member and into engagement with the horizontal groove portions thereof for enabling the shifter member to be operated without opposition by said spring means.

11. Apparatus for controlling the lateral displacement of a railway car coupler, said apparatus comprising a shifter member for supporting a coupler, a carrier member upon which said shifter member is slidably mounted, a centralizing control element comprising a horizontal arm and a depending stem, said shifter member having means cooperating with said centralizing control element for moving the latter upon movement of said shifter member in either direction from a normal central position, spring means actuated by said centralizing control element upon movement of said shifter member from said position, means on said carrier member cooperating with said depending stem of said element for guiding the latter, and manually operable means for shifting said centralizing control element out of position for movement with said shifter member.

12. Apparatus for controlling the lateral displacement of a railway car coupler, said apparatus comprising a shifter member for supporting a coupler, a carrier member upon which said shifter member is slidably mounted, a centralizing-control element, means on said shifter member cooperating with said element for causing the latter to move with said shifter member upon displacement thereof in either of opposite directions from normal central position, spring means cooperating with said element for opposing movement of said shifter member during said movements thereof, means comprising a lever for shifting said element to an inactive position, said lever having trunnions at opposite ends of a portion thereof, means on said shifter member providing bearings for said trunnions.

and manually operable means connected to said lever below said trunnions for causing said lever to rock about the axis of either trunnion.

13. Apparatus for controlling the lateral displacement of a railway car coupler, said apparatus comprising a shifter member for supporting a coupler, a carrier member upon which said shifter member is slidably mounted, a centralizing-control element, means on said shifter member cooperating with said element for causing the latter to move with said shifter member upon displacement thereof in either of opposite directions from normal central position, spring means cooperating with said element for opposing movement of said shifter member during said movements thereof, a lever having upper trunnions at opposite ends of a portion thereof, means on said shifter member providing bearings for said trunnions, said centralizing control element having a depending portion cooperating with a surface of said lever between said trunnions, and means connected to said lever below said trunnions for causing said lever to rock about the axis of either trunnion and thereby shift said element to an inactive position.

14. Apparatus for controlling the lateral displacement of a railway car coupler, said apparatus comprising a shifter member for supporting a coupler, a carrier member upon which said shifter member is slidably mounted, a centralizing-control element, means on said shifter member cooperating with said element for causing the latter to move with said shifter member upon displacement thereof in either of opposite directions from normal central position, spring means cooperating with said element for opposing movement of said shifter member during said movements thereof, a lever having trunnions at opposite ends of a portion thereof, means on said shifter member providing bearings for said trunnions, a member connected to said lever and extending into operative relation to said centralizing control element for shifting the latter to an inactive position upon operation of said lever, and means connected to said lever below said trunnions for causing said lever to rock about the axis of either trunnion and thereby to shift said element to an inactive position.

15. Apparatus for controlling the lateral displacement of a railway car coupler, said apparatus comprising a shifter member for supporting a coupler, a carrier member upon which said shifter member is slidably mounted, a centralizing-control element, means on said shifter member cooperating with said element for causing the latter to move with said shifter member upon displacement thereof in either of opposite directions from normal central position, spring means cooperating with said element for opposing movement of said shifter member during said movements thereof, a lever having trunnions at opposite ends of a portion thereof, means on said shifter member providing bearings for said trunnions, a bail having a horizontal portion passing through a slot in said lever below said trunnions and also having vertical arms extending upwardly to points adjacent said centralizing control element for shifting the latter to an inactive position upon operation of said lever, and means connected to said lever below said trunnions for causing said lever to rock about the axis of either trunnion and thereby to shift said element through said bail to an inactive position.

16. In apparatus for controlling the lateral displacement of a railway car coupler, a laterally displaceable support for said coupler, means responsive to movement of said support in either of opposite directions from a normal central position for opposing said movement and restoring said support to said position, and disabling means for rendering the first mentioned means ineffective for restoring said support, said disabling means comprising a lever having trunnions at opposite ends of a portion thereof and manually operable means connected to said lever below said trunnions.

17. In apparatus for controlling the lateral displacement of a railway car coupler, a laterally displaceable support for said coupler, means responsive to movement of said support in either of opposite directions from a normal central position for opposing said movement and restoring said support to said position and disabling means for rendering the first mentioned means ineffective for restoring said support, said disabling means comprising a lever having trunnions at opposite ends of a portion thereof, and also having a portion depending therefrom, and means operable from opposite sides of the car and connected to said depending portion of said lever for rocking the same about said trunnions respectively.

18. In apparatus for controlling the lateral displacement of a railway car coupler, a laterally displaceable support for said coupler, means responsive to movement of said support in either of opposite directions from a normal central position for opposing said movement and restoring said support to said position, said means comprising spring means and an element movable into and out of position for providing a base of reaction between said spring means and said support, and disabling means for causing said element to be shifted out of said position to thereby render the first mentioned means ineffective for restoring said support, said disabling means comprising a lever having trunnions at opposite ends of a portion thereof and manually operable means connected to said lever below said trunnions.

19. In apparatus for controlling the lateral displacement of a railway car coupler, a laterally displaceable support for said coupler, means responsive to movement of said support in either of opposite directions from a normal central position for opposing said movement and restoring said support to said position, said means comprising spring means and an element permanently associated with said support and shiftable into and out of position for providing a base of reaction between said spring means and said support, and manually operable means for causing said element to be shifted out of said position to thereby render the first mentioned means ineffective for restoring said support.

20. In apparatus for controlling the lateral displacement of a railway car coupler, a laterally displaceable support for said coupler, means responsive to movement of said support in either of opposite directions from a normal central position for opposing said movement and restoring said support to said position, a lever having trunnions at opposite ends of a portion thereof and also having a portion depending below said trunnions, bearing means on said support for receiving said trunnions, and manually operable means connected to said lever below said trunnions for operating said lever to cause the first mentioned means to be rendered ineffective for restoring said support and concurrently to bring said depending portion of said lever into engagement with a portion of said support, said manually operated means being adapted upon further movement thereof to shift said support laterally.

21. In apparatus for controlling the lateral displacement of a railway car coupler, a laterally-displaceable coupler support having horizontal and vertical groove portions, means responsive to movement of said support in either of opposite directions from a normal central position for opposing said movement and restoring said support to said position, said means comprising spring means and an element normally engaged in a vertical groove portion of said support for transmitting pressure thereto from said spring means upon movement of said support from said position, and manually operable means for shifting said element into engagement with a horizontal groove portion of said support for thereby enabling said support to be displaced laterally without opposition by said spring means.

22. In apparatus for controlling the lateral displacement of a railway car coupler, a laterally displaceable coupler support, means responsive to movement of said support in either of opposite directions from a normal central position for opposing said movement and restoring said support to said position, means comprising a member for disabling the first-mentioned means by rendering the same ineffective for restoring said support, and manually operable means adapted upon a continuous operation thereof in a given direction to shift said member to disabling position and then to displace said support, said member having a portion thereof engaged with a portion of said support during operation of said member by said manually operable means.

23. In apparatus for controlling the lateral displacement of a railway car coupler, a laterally-displaceable coupler support, means responsive to movement of said support in either of opposite directions from a normal central position for opposing said movement and restoring said support to said position, a lever adapted to disable the first-mentioned means, and manually operable means for causing said lever to disable said first-mentioned means and to transmit force from said manually operable means to said support at a plurality of spaced points for enabling said manually operable means to displace said support.

24. In apparatus for controlling the lateral displacement of a railway car coupler, a laterally displaceable coupler support, means responsive to movement of said support in either of opposite directions from a normal central position for opposing said movement and restoring said support to said position, a lever mounted on said support and adapted to be moved to a position for disabling the first mentioned means, said lever comprising a pair of spaced upper trunnions and a depending arm, bearing means on said support for said trunnions, said support having surfaces on opposite sides of said arm and each engageable thereby when said lever is swung in one direction or the other to disabling position, and means manually operable from either side of the car for swinging said lever about either trunnion into disabling position and engaging its arm with a corresponding one of the surfaces on said support to enable further actuation of said manually operable means to displace said support.

25. In apparatus for controlling the lateral displacement of a railway car coupler, a carrier member comprising a longitudinally extending spring housing chamber, a spring in each end of the chamber, said springs being spaced from each other, abutment means at the inner end of each spring for receiving thrusts therefrom, the end portions of said member being constructed to provide passages beyond the respective chamber ends having openings out of axial alinement with the springs for enabling the respective springs to be inserted into said chamber, means at the ends of said chamber cooperating with the outer ends of said springs for receiving thrusts therefrom, and means for closing said openings and retaining said thrust-receiving means.

26. In apparatus for controlling the lateral displacement of a railway car coupler, a carrier member comprising a longitudinally extending spring housing chamber, a spring in each end of the chamber, said springs being spaced from each other, abutment means at the inner end of each spring for receiving thrusts therefrom, the end portions of said member being constructed to provide passages beyond the respective chamber ends having openings out of axial alinement with the springs for enabling the respective springs to be inserted into said chamber from a direction at an angle to the axis of the chamber, means at the ends of said chamber and cooperating with the outer ends of said springs for receiving thrusts therefrom, means for closing the openings through which the springs are inserted and retaining said thrust-receiving means and an element mounted in said carrier member between said springs and arranged to be centralized by said springs.

27. In apparatus for controlling the lateral displacement of a railway car coupler, a carrier member comprising a longitudinally extending spring housing chamber, a spring in each end of the chamber, said springs being spaced from each other, abutment means at the inner end of each spring for receiving thrusts therefrom, the end portions of said member beyond the respective chamber ends being channeled to enable the respective springs to be inserted into said chamber, means at the ends of said chamber and cooperating with the outer ends of said springs for receiving thrusts therefrom, and an element mounted in said carrier member between said springs, said carrier member having longitudinally extending slots in the sides thereof and said element having portions extending through said slots.

28. In apparatus for controlling the lateral displacement of a railway car coupler, a carrier member comprising a longitudinally extending spring housing chamber, a spring in each end of the chamber, said springs being spaced from each other, abutment means at the inner end of each spring for receiving thrusts therefrom, the end portions of said member beyond the respective chamber ends being channeled to enable the respective springs to be inserted into said chamber, means at the ends of said chamber and cooperating with the outer ends of said springs for receiving thrusts therefrom, and an element mounted in said carrier member between said springs, said carrier member having longitudinally extending slots in the sides thereof and another longitudinal slot in the bottom, all of said slots communicating with said chamber, and said element comprising a transverse arm extending through said slots in the sides of said carrier member and a depending stem extending into said slot in the bottom of said carrier member.

29. In apparatus for controlling the lateral displacement of a railway car coupler, a carrier member comprising a longitudinally extending spring housing chamber, a spring in each end of the chamber, said springs being spaced from each other, abutment means at the inner end of each spring for receiving thrusts therefrom, the end portions of said member beyond the respective chamber ends being channeled to enable the respective springs to be inserted into said chamber, means at the ends of said chamber and cooperating with the outer ends of said springs for receiving thrusts therefrom, and an element mounted in said carrier member between said tical slots communicating with said longitudinally extending slots in the sides thereof and vertical slots communicating with said longitudinally extending slots, and said element having portions projecting through said longitudinally extending slots and vertical projections on said portions for overlapping the adjacent walls of said carrier member when said element is moved into engagement with said vertical slots.

30. In apparatus for controlling the lateral displacement of a railway car coupler, a carrier member comprising a longitudinally extending spring housing chamber, a spring in each end of the chamber, said springs being spaced from each other, abutment means at the inner end of each spring for receiving thrusts therefrom, the end portions of said member beyond the respective chamber ends being channeled to enable the respective springs to be inserted into said chamber, means at the ends of said chamber and cooperating with the outer ends of said springs for receiving thrusts therefrom, and an element mounted in said carrier member between said springs, said carrier member having longitudinally extending slots in the sides thereof and vertical slots communicating with said longitudinally extending slots, and said element having portions projecting through said longitudinally extending slots, said element also having recesses for receiving abutment means at the inner ends of said springs when said element is engaged with said vertical slots.

31. In apparatus for controlling the lateral displacement of a railway car coupler, a carrier member comprising a longitudinally extending spring housing chamber, springs in said chamber, the end portions of said member outwardly of said chamber being channeled to enable the insertion of springs into said chamber, and closure means for the ends of said chamber and adapted to receive thrusts from the respective springs.

32. Apparatus as defined by claim 31, wherein the closure means comprises a shim inserted into each end of the chamber and having a tongue engaging a recess in a wall of said carrier member.

33. Apparatus as defined by claim 31, wherein the closure means comprises a shim inserted into each end of the chamber and having a tongue engaging a recess in a wall of said carrier member, said member having portions of its wall adjacent said recess extended into overlapping relation to said shim.

34. Apparatus as defined by claim 31, wherein the closure means comprises a member having side flanges fitting into grooves in side walls of said carrier member and also having end extensions, and a bolt engaging said carrier member and cooperating with said extensions to retain the closure member in position.

35. In apparatus for controlling the lateral displacement of a railway car coupler, a laterally-displaceable support for said coupler, means responsive to lateral movement of said support from a normal central position for opposing said movement and restoring said support to said position, a plate attached to the bottom of said support, said plate having a slot and a pair of bearing recesses, a lever for disabling the first mentioned means and comprising a pair of trunnions engageable in said recesses and an arm extending downwardly through said slot, and lugs extending upwardly from said plate on opposite sides of said slot for guiding said lever during rocking thereof about the axis of either of said trunnions.

36. In apparatus for controlling the lateral displacement of a railway car coupler; a carrier member comprising a longitudinally extending spring housing chamber; the end portions of said member outwardly of said chamber being channeled to enable the insertion of spring units into said chamber; abutment means at the inner end of each spring unit for receiving thrusts from the spring unit therein; said chamber having mounted therein spring units each comprising a spring, caps engaged by opposite ends of said spring, and a bolt passing longitudinally through said caps and said spring; and abutment means for each unit at the corresponding end of the chamber.

37. In apparatus for controlling the lateral displacement of a railway car coupler, a laterally-displaceable support for said coupler, means responsive to lateral movement of said support from a normal central position for opposing said movement and restoring said support to said position, means comprising a movable member for disabling the first mentioned means, a manually operable rod for actuating said movable member, a loop element supporting said rod, and a supporting element for said loop element and having an opening into which an end of said loop element extends, the other end portion of said loop element extending vertically along one side of said supporting element for limiting swinging movement of said loop element with respect to said supporting element in one direction.

38. Apparatus as defined by claim 37, wherein said other end portion of said loop element not only extends vertically along one side of said supporting element but is further bent around said supporting element and extends vertically along the opposite side thereof whereby swinging movement of said loop element with respect to said supporting element is limited in either of two directions.

39. In apparatus for controlling the lateral displacement of a railway car coupler, a laterally-displaceable coupler support, means responsive to lateral movement of said support from a normal central position for opposing said movement and restoring said support to said position, means comprising a movable element for disabling the first mentioned means, and manually operable means mounted on said support and adapted by a continuous movement thereof in one direction to first actuate said disabling element and then displace said support.

40. Apparatus as defined by claim 39, wherein the disabling element comprises a rockable lever adapted to be swung by said manually operable means to disabling position and into engagement with a portion of said support spaced from the pivot of said lever prior to displacement of said support by said manually operable means.

41. Apparatus as defined by claim 39, wherein the manually operable means comprises a rod connected to said disabling element and an arm pivotally mounted on said support and connected to said rod.

42. Apparatus as defined by claim 39, wherein the manually operable means comprises a rod connected to said disabling element and an arm pivotally mounted on said support and connected to said rod, said arm having a reduced laterally projecting portion with vertically extending side flanges at opposite ends thereof, and said rod having a loop portion extending over said reduced portion of said arm between said vertically extending side flanges.

43. Apparatus as defined by claim 39, wherein the manually operable means comprises a rod connected to said disabling element and an arm pivotally mounted on said support and connected to said rod, said arm having a reduced laterally extending portion engaged by a loop on said rod and also having a laterally projecting handle extension, said arm being mounted on a pivot pin on said support, and said handle extension having an element extending vertically therefrom and pivotally mounted on said pin.

44. Apparatus for controlling the lateral displacement of a railway car coupler, said apparatus comprising a shifting member for supporting a coupler, a carrier member upon which said shifter member is slidably mounted, an element, means on said shifter member cooperating with said element for causing the latter to move with said shifter member upon displacement thereof in either of opposite directions from normal central position, spring means cooperating with said element for opposing movement of said shifter member during said movements thereof, and manually operable means supported by one of said members for shifting said element to an inactive position relative to said shifter.

ARTHUR J. BAZELEY.